(12) United States Patent
Lee et al.

(10) Patent No.: US 11,670,965 B2
(45) Date of Patent: Jun. 6, 2023

(54) WIRELESS POWER TRANSMITTING APPARATUS FOR WIRELESS CHARGING HAVING COMPATIBILITY

(71) Applicant: WITS Co., Ltd., Yongin-si (KR)

(72) Inventors: Jong Jin Lee, Suwon-si (KR); Heon Gyu Lee, Suwon-si (KR); Sang Hyup Lee, Suwon-si (KR); Tae Yong Kim, Suwon-si (KR); O Seong Choi, Suwon-si (KR)

(73) Assignee: WITS CO., LTD., Gyeonggi-do (KR)

( * ) Notice: Subject to any disclaimer, the term of this patent is extended or adjusted under 35 U.S.C. 154(b) by 53 days.

(21) Appl. No.: 17/496,981

(22) Filed: Oct. 8, 2021

(65) Prior Publication Data
US 2022/0320903 A1    Oct. 6, 2022

Related U.S. Application Data

(63) Continuation of application No. PCT/KR2021/009566, filed on Jul. 23, 2021.

(30) Foreign Application Priority Data

Mar. 30, 2021  (KR) .......................... 10-2021-0041473
Jun. 23, 2021  (KR) .......................... 10-2021-0081712

(51) Int. Cl.
*H02J 50/10* (2016.01)
*H04B 5/00* (2006.01)
*H02J 7/00* (2006.01)

(52) U.S. Cl.
CPC ............ *H02J 50/10* (2016.02); *H02J 7/0044* (2013.01); *H04B 5/0037* (2013.01)

(58) Field of Classification Search
CPC ........ H02J 50/10; H02J 7/0044; H04B 5/0037
(Continued)

(56) References Cited

U.S. PATENT DOCUMENTS 8,855,354 B2 * 10/2014 He ........................... H04R 3/00
                                                  381/386
2014/0145674 A1 * 5/2014 Jang ...................... H02J 50/005
                                                  320/108
(Continued)

FOREIGN PATENT DOCUMENTS

KR    20-2014-0001094 U    2/2014
KR    10-2016-0096085 A    8/2016
(Continued)

*Primary Examiner* — Alfonso Perez Borroto
(74) *Attorney, Agent, or Firm* — Harness, Dickey & Pierce, P.L.C.

(57) ABSTRACT

Disclosed is a wireless power transmitting apparatus including a power transmitting coil generating an induced electromotive force on a power receiving coil of a terminal, a magnet casing composed of a first space in a cylinder shape where the power transmitting coil is inserted, and a second space sharing a central axis of the cylinder with the first space, wherein the second space is a space between the first space and a cylinder having a diameter greater than a diameter of the cylinder of the first space, a ring magnet disposed in the second space of the magnet casing in a shape of a ring, wherein the ring magnet has a height smaller than a height of the magnet casing, and is movable in a vertical direction of the magnet casing by external magnetism, and a cover constructed in a direction perpendicular to an axis of the power transmitting coil.

14 Claims, 20 Drawing Sheets

(58) Field of Classification Search
USPC .......................................................... 307/104
See application file for complete search history.

(56) References Cited

U.S. PATENT DOCUMENTS

2017/0093198 A1   3/2017  Graham et al.
2019/0074729 A1   3/2019  Wittenberg et al.

FOREIGN PATENT DOCUMENTS

| KR | 2017-0093029 A | 8/2017 |
| KR | 101790891 B1 | 10/2017 |
| KR | 102047057 B1 | 11/2019 |
| KR | 10-2021-0037577 A | 4/2021 |

\* cited by examiner

[FIG. 1]
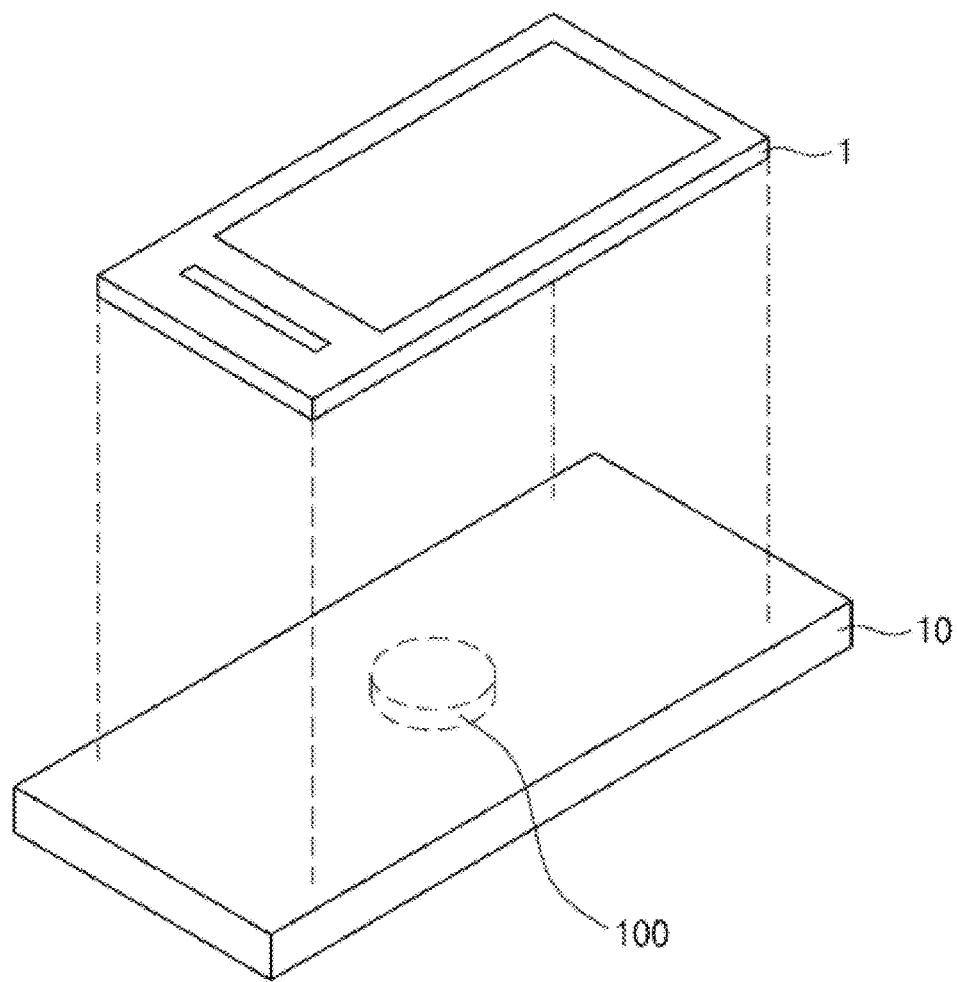

[FIG. 2]
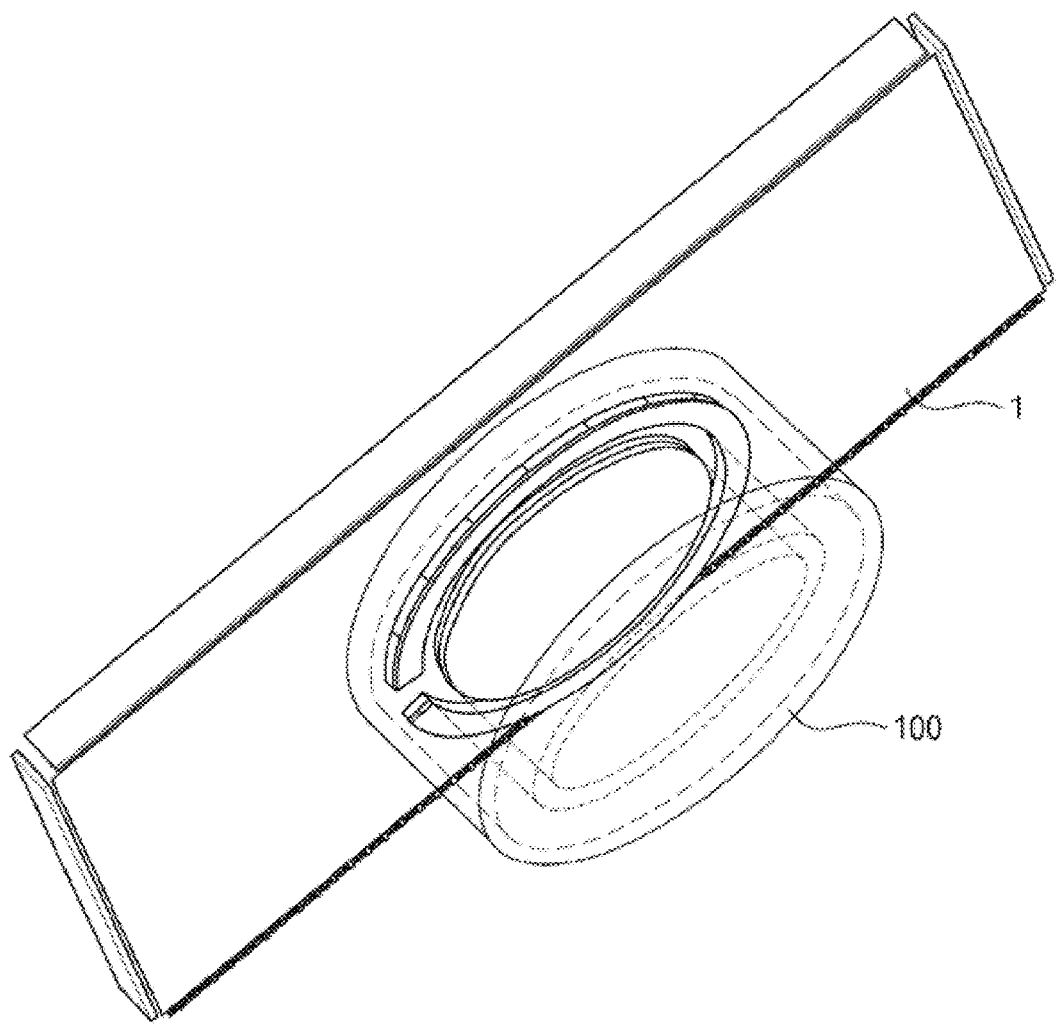

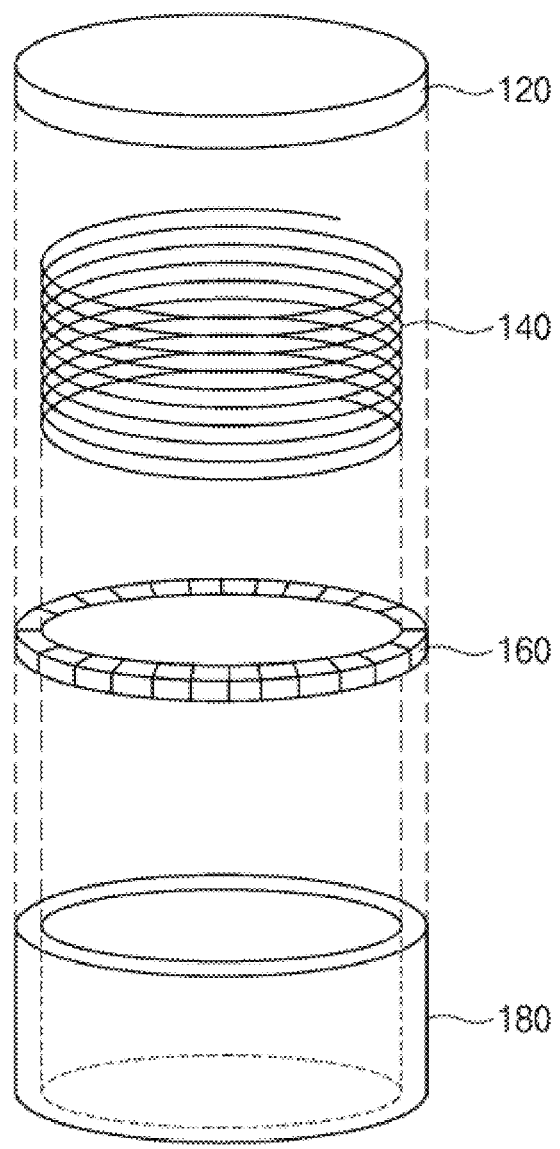
[FIG. 3]

[FIG. 4]
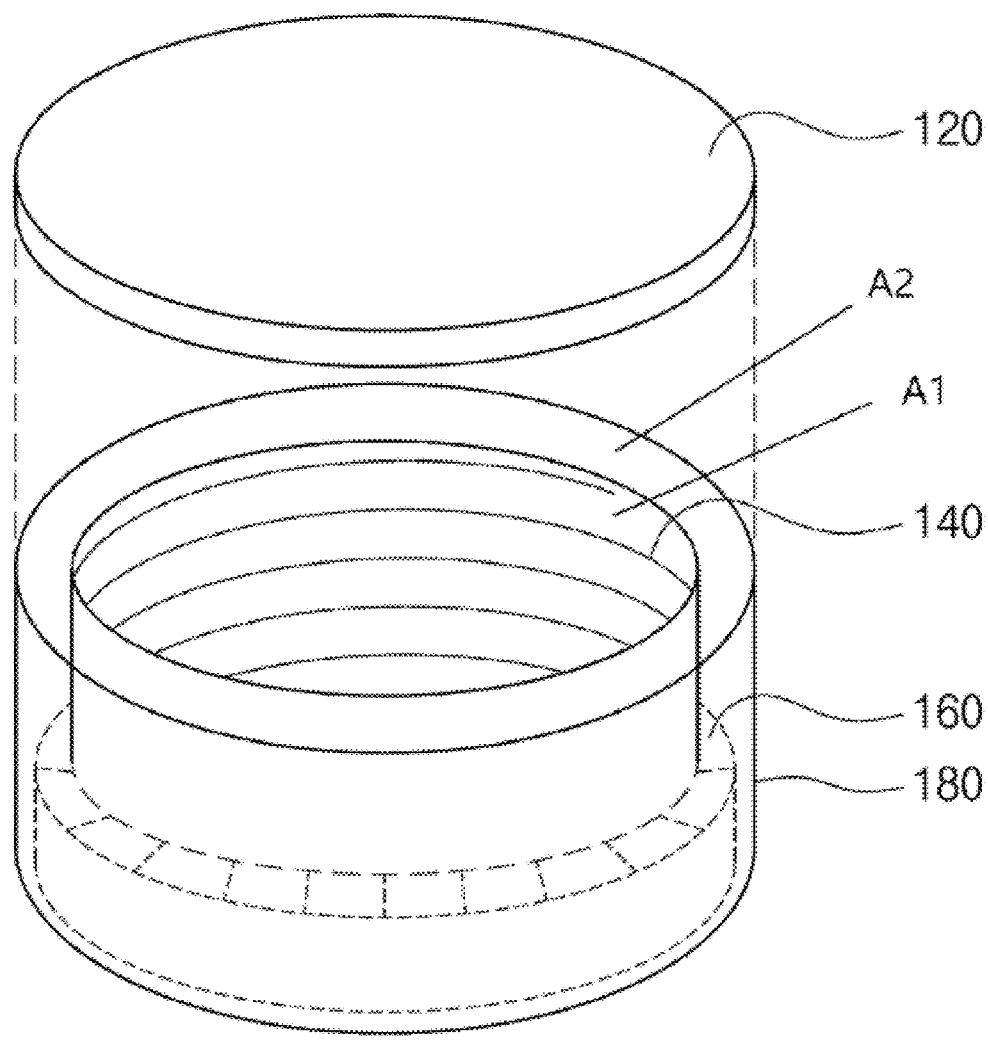

[FIG. 5]
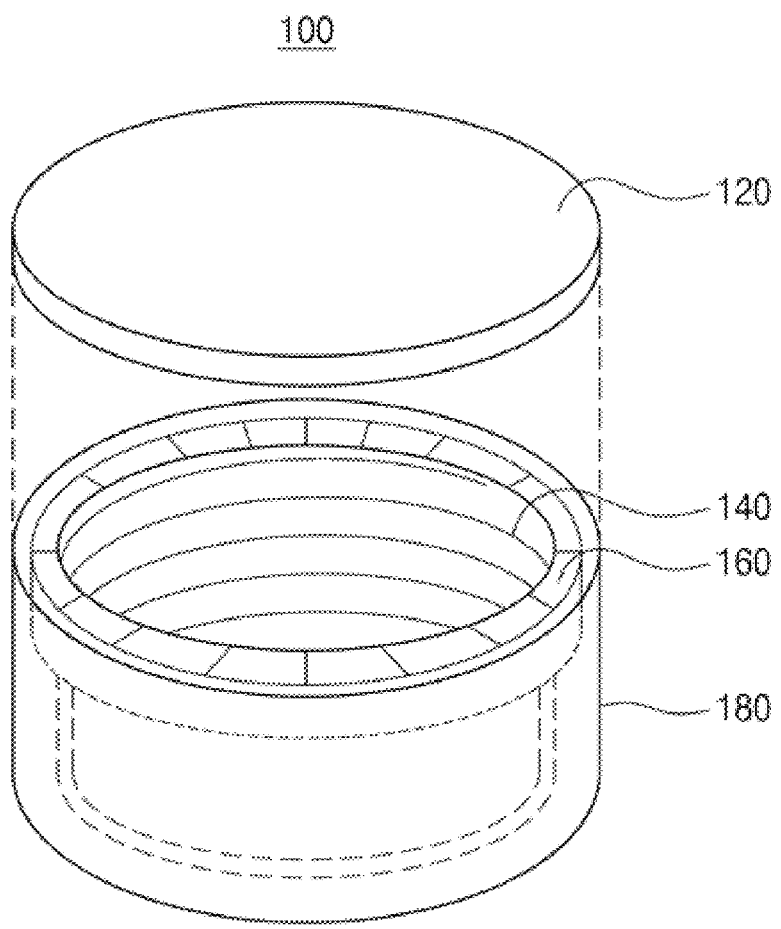

[FIG. 6]
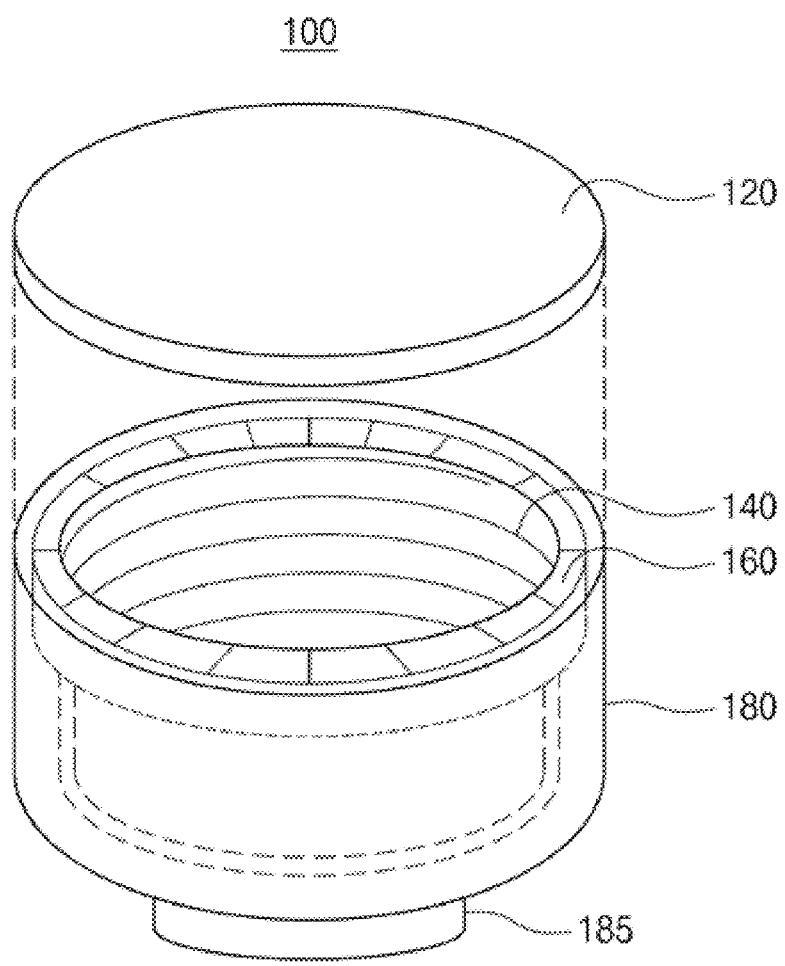

[FIG. 7]
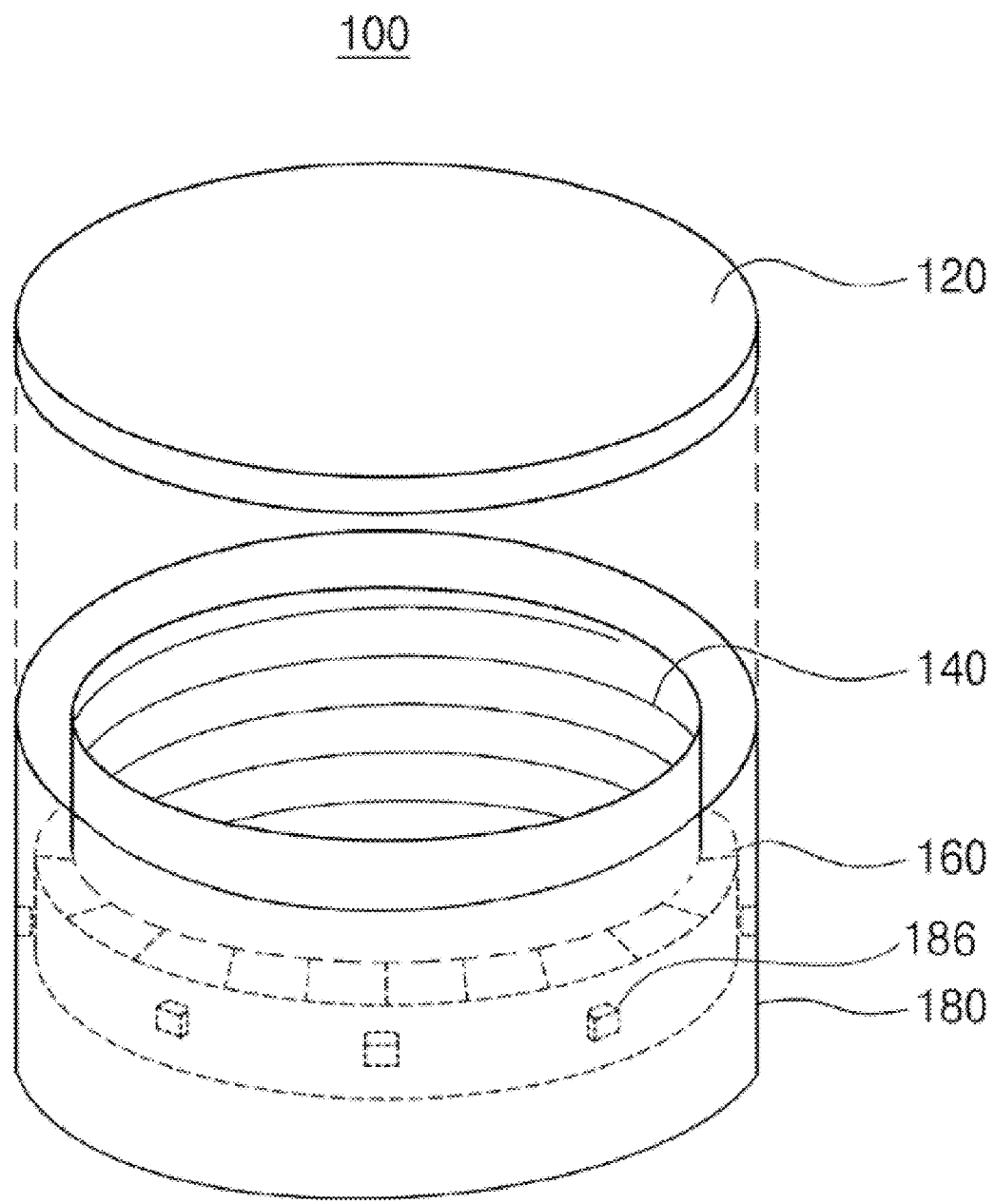

[FIG. 8]
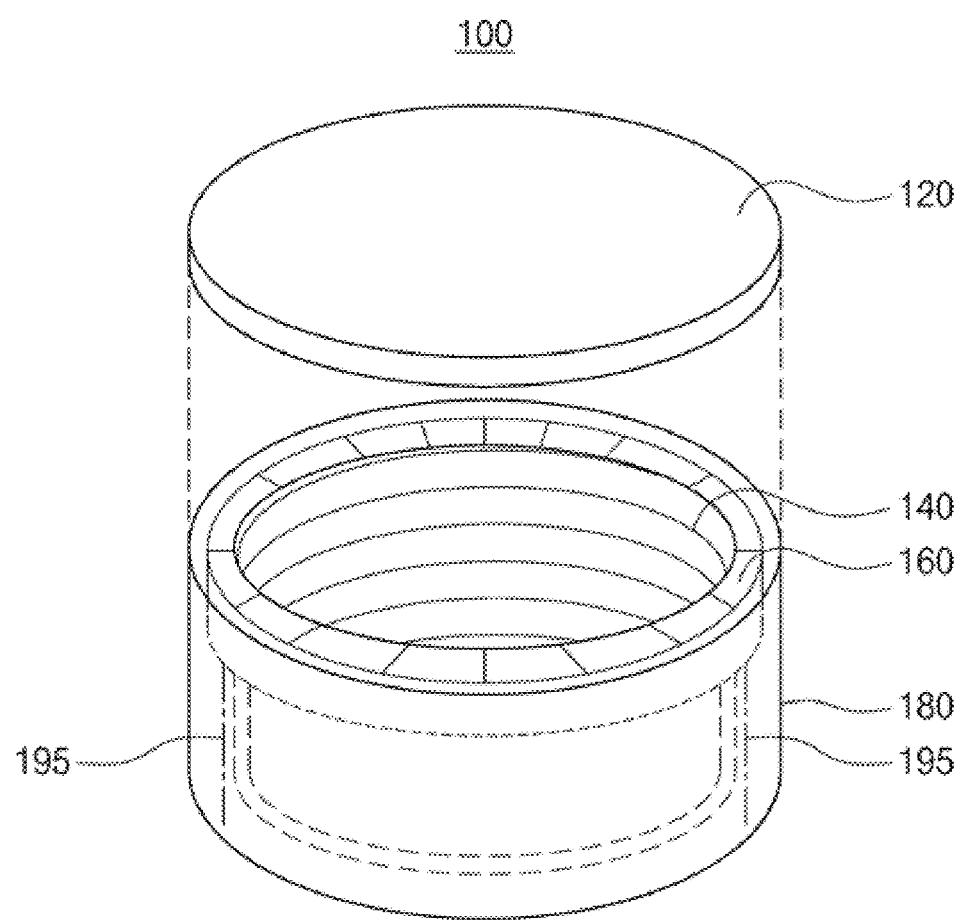

[FIG. 9]
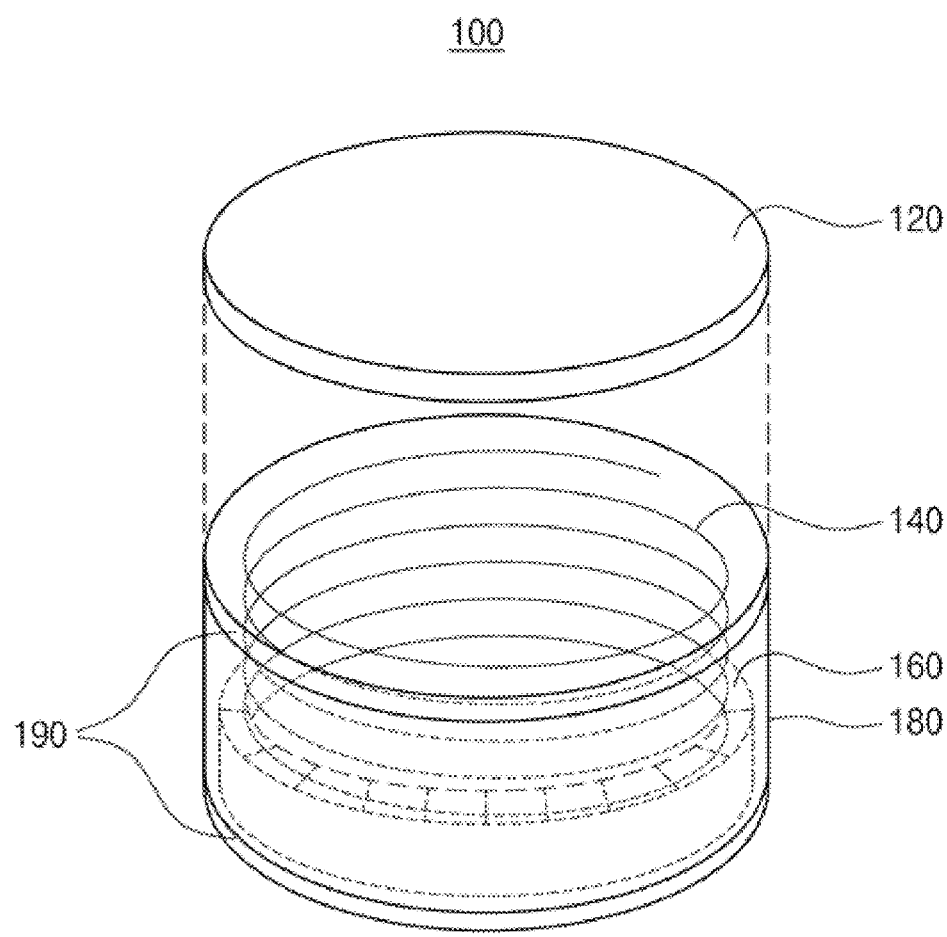

[FIG. 10]
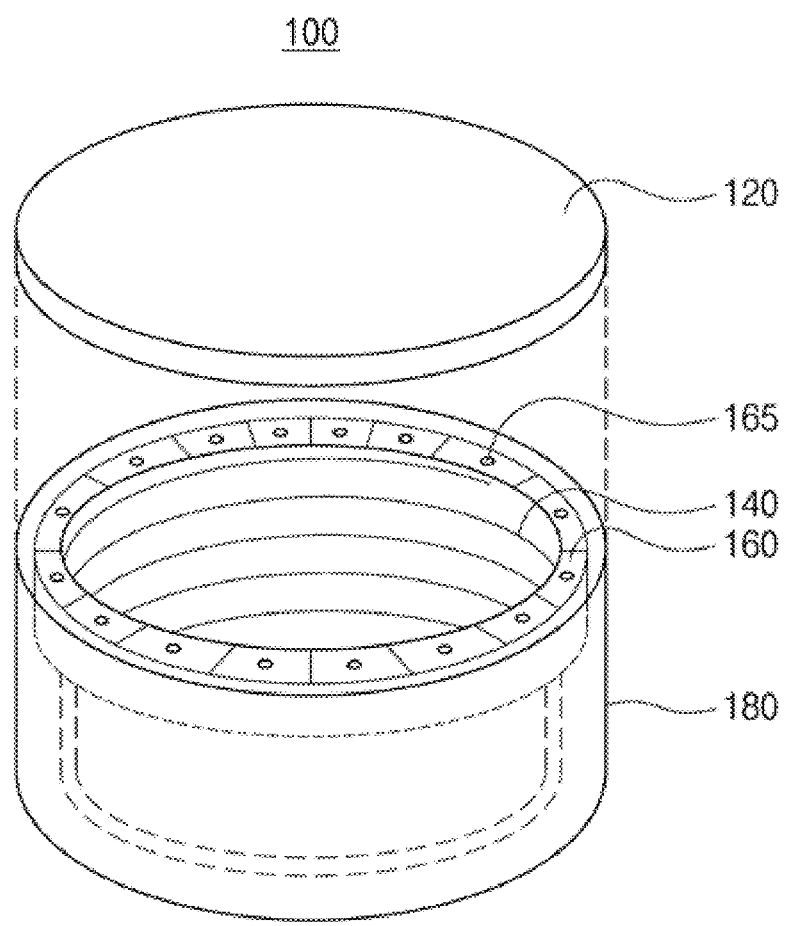

[FIG. 11]
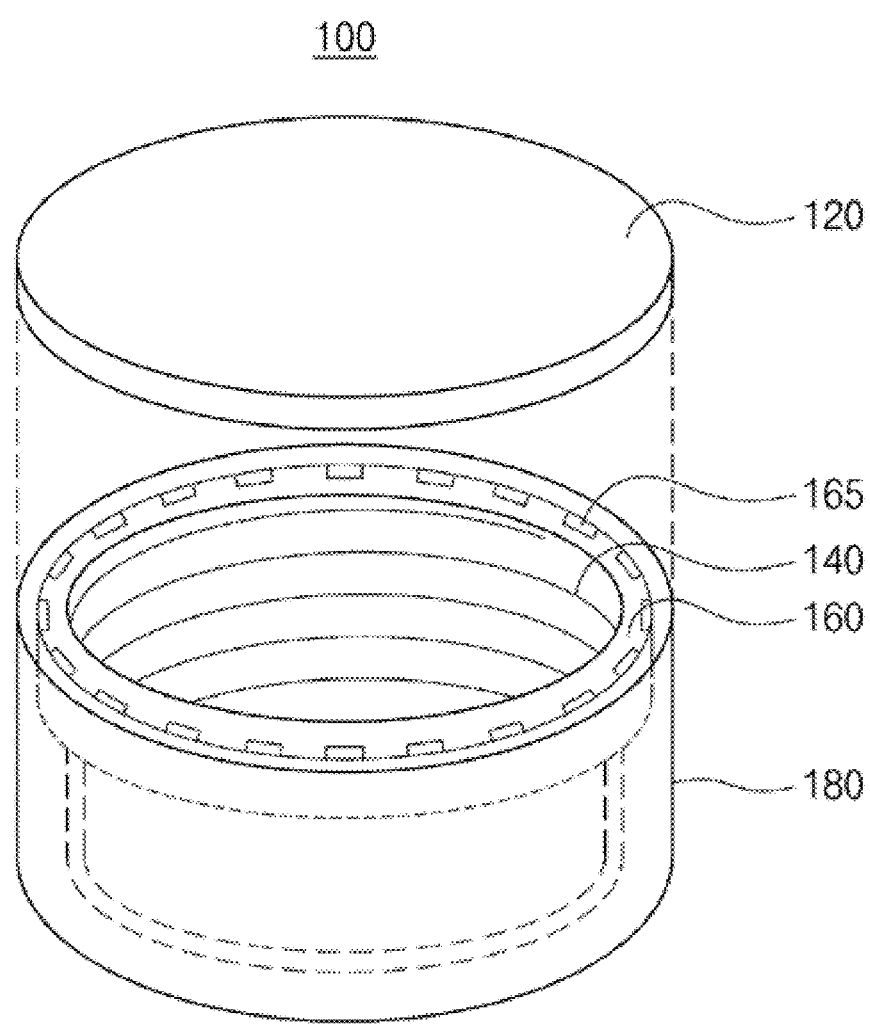

[FIG. 12]
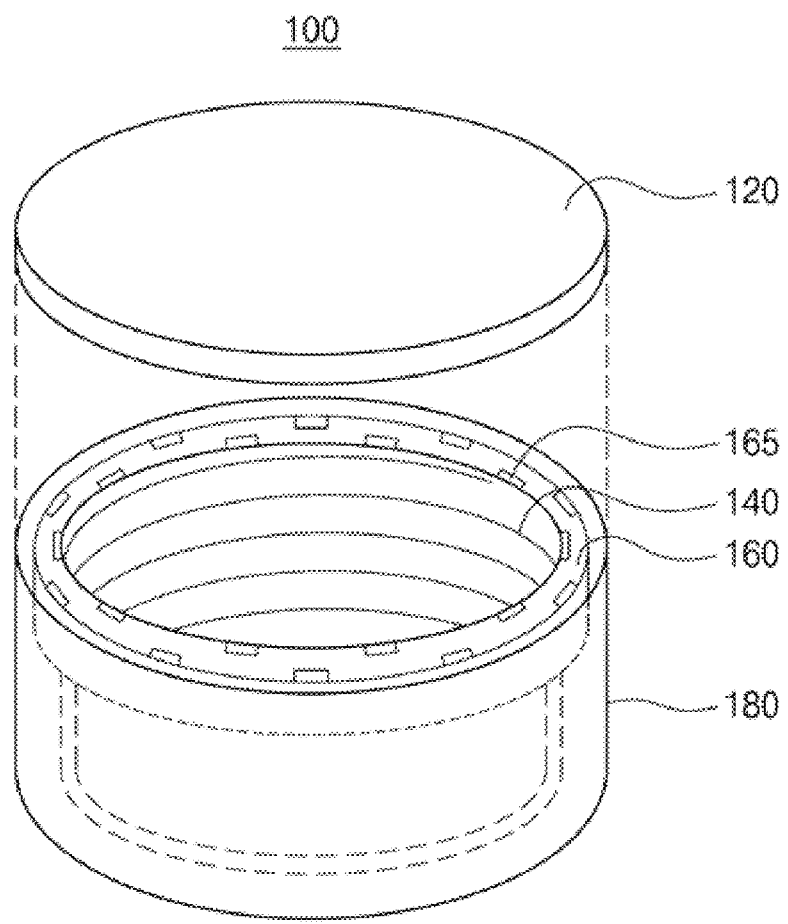

[FIG. 13]
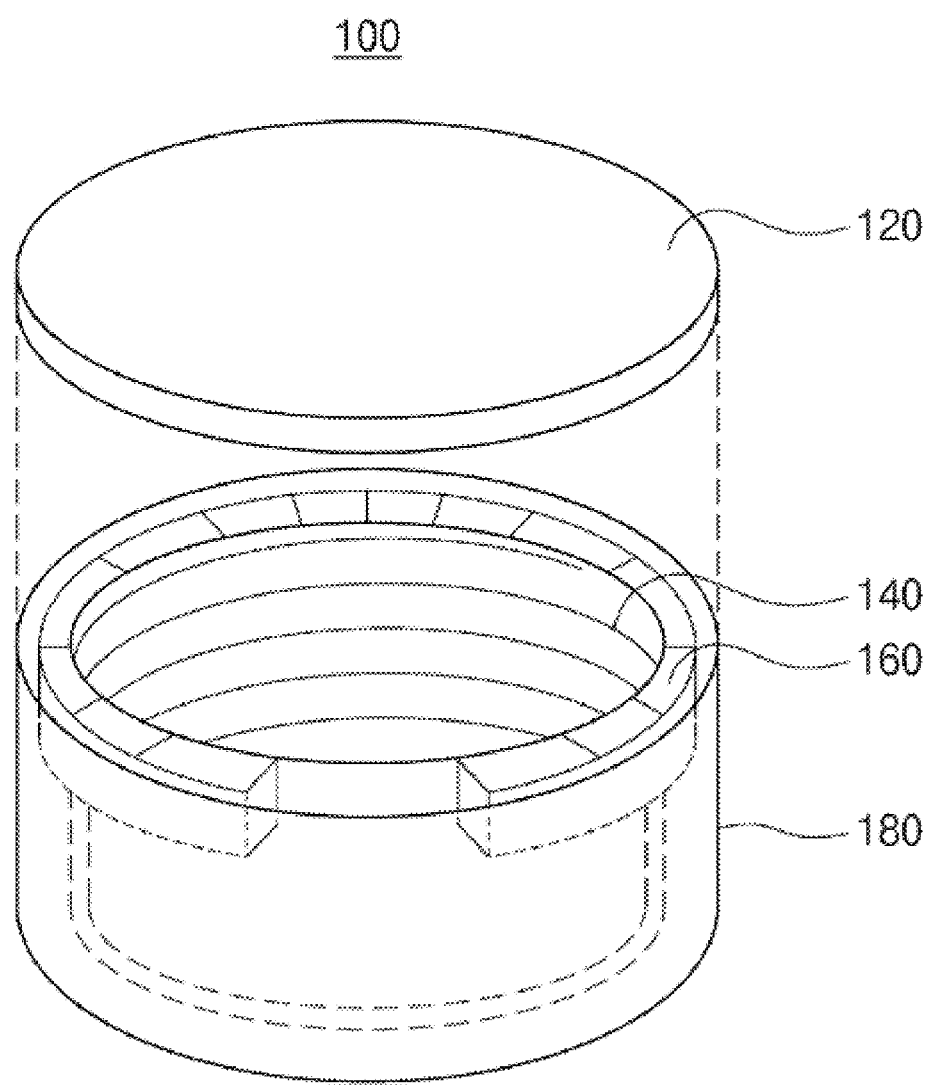

[FIG. 14]
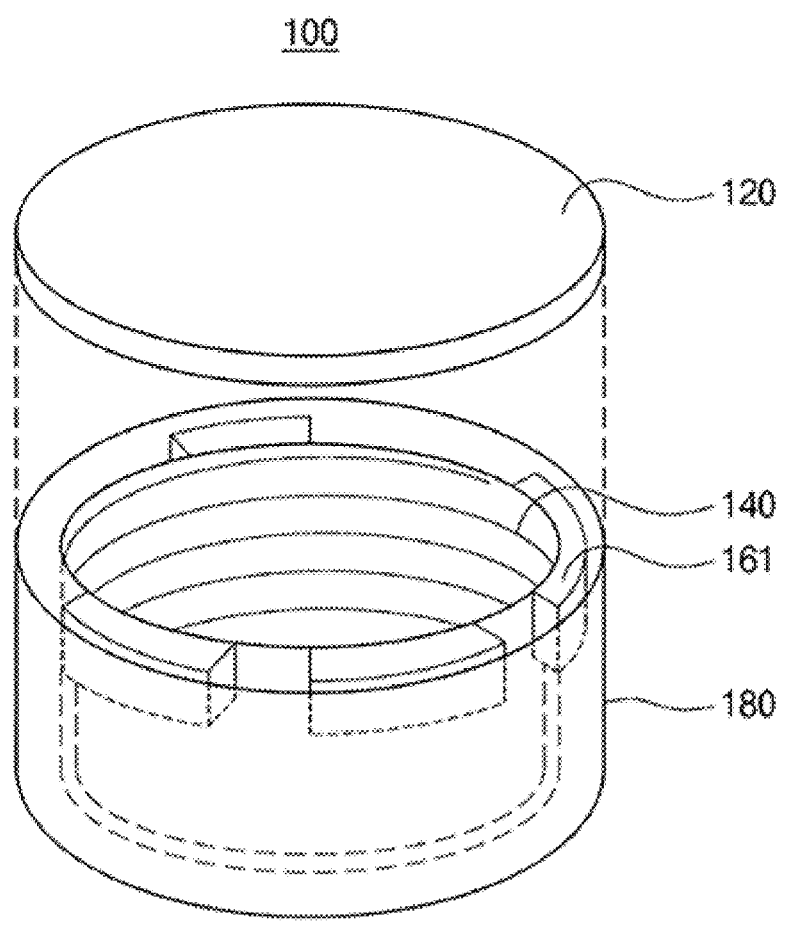

[FIG. 15]
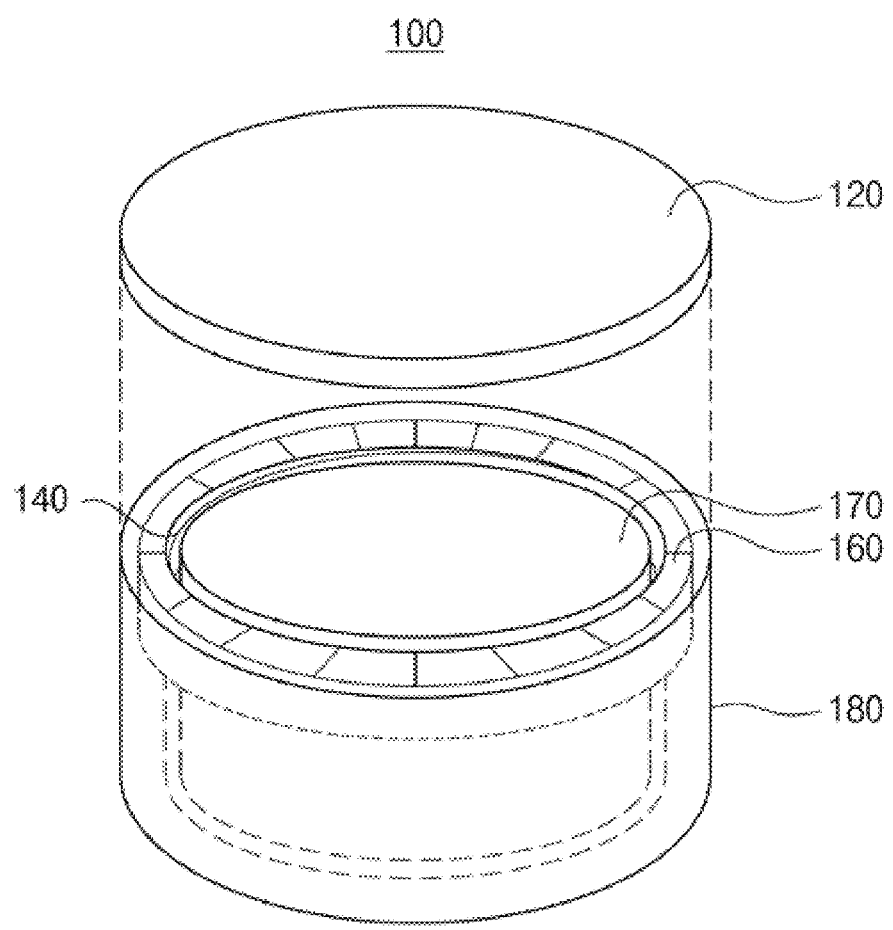

[FIG. 16]
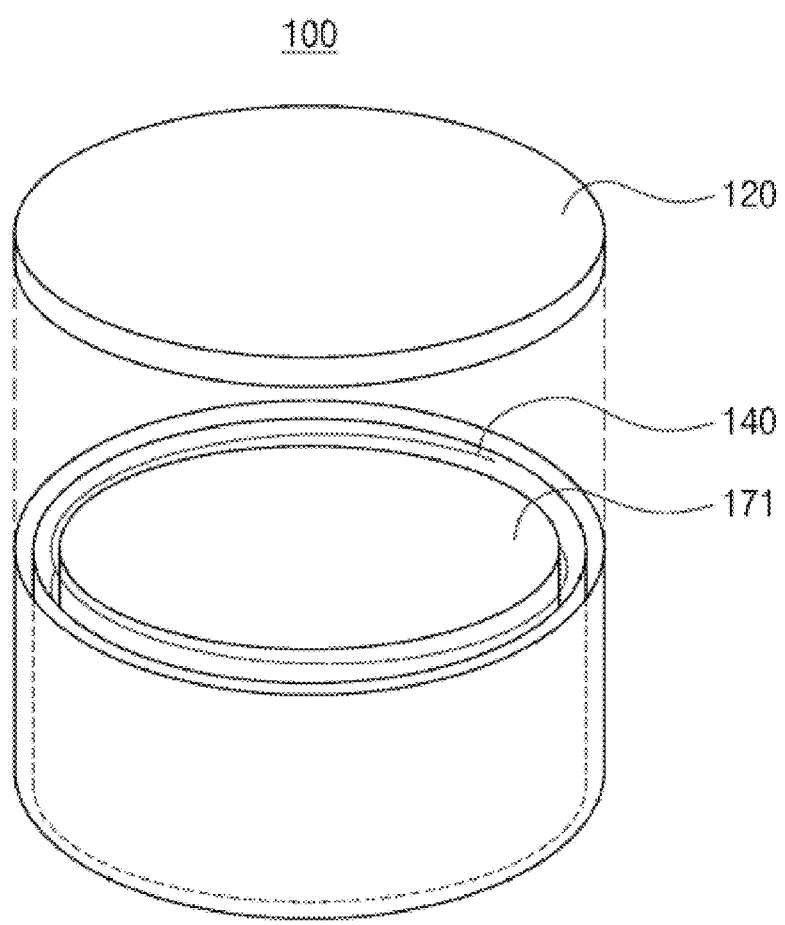

[FIG. 17]
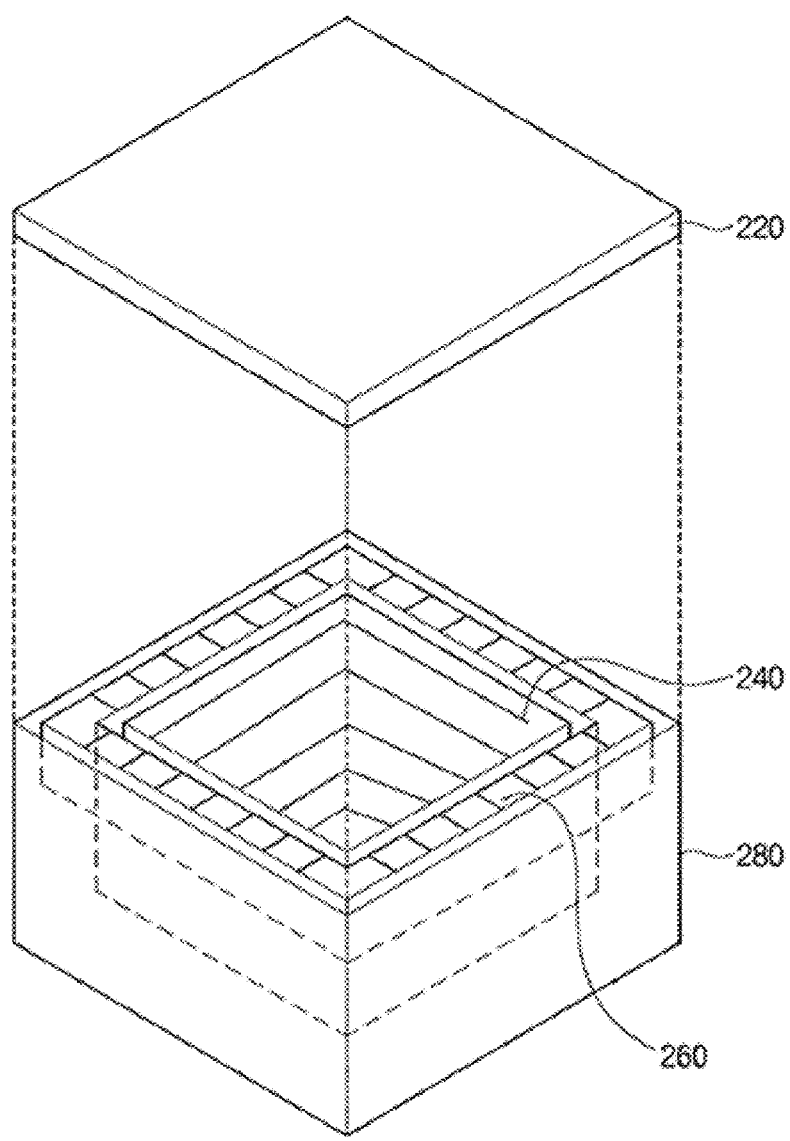

[FIG. 18]
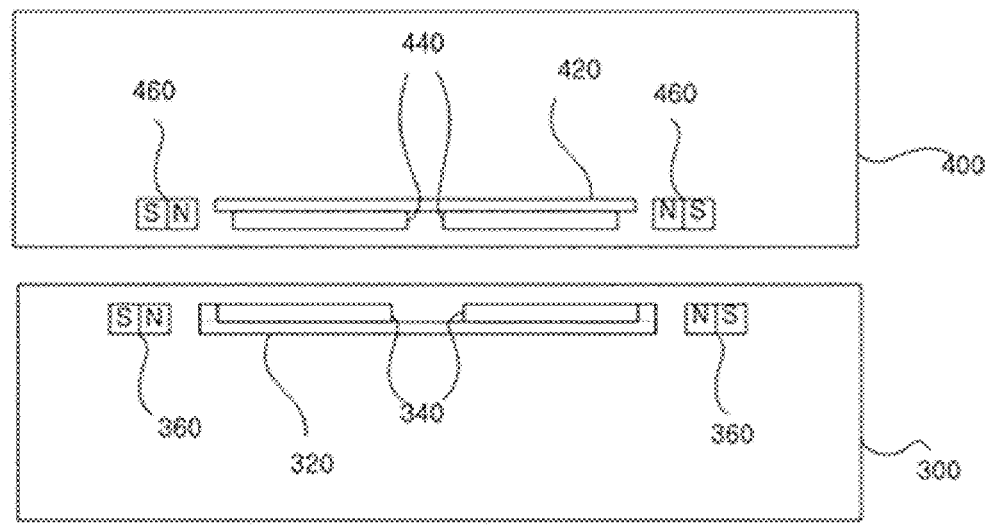
[FIG. 19]
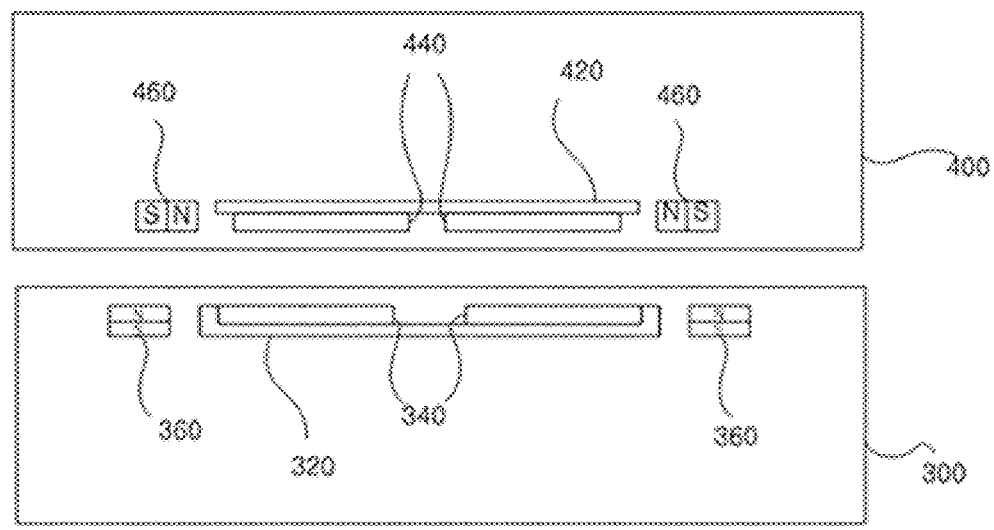

[FIG. 20]
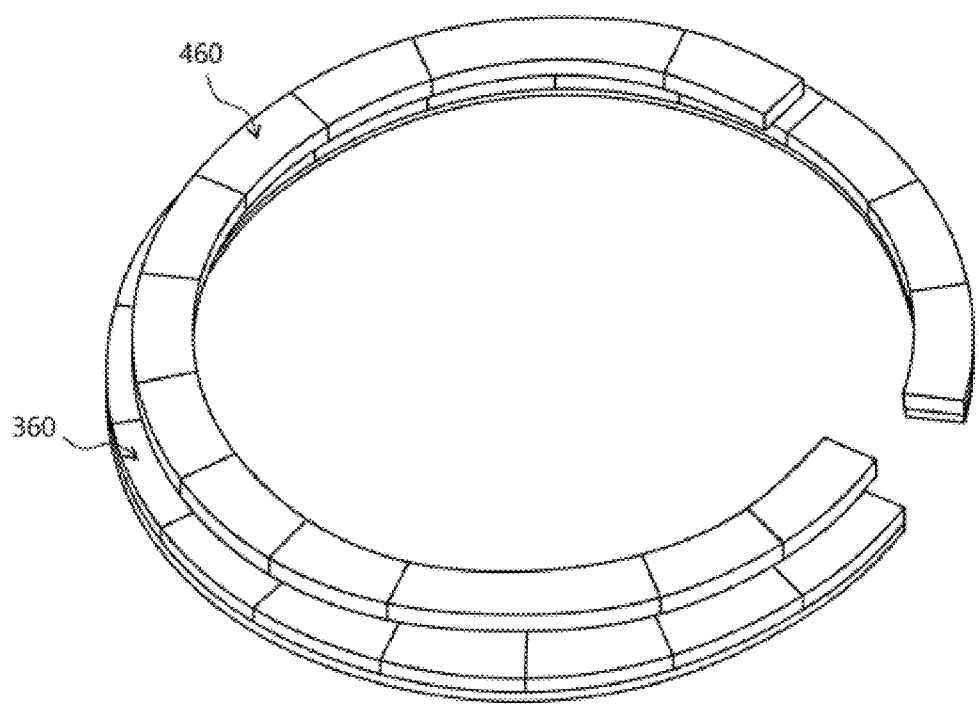

[FIG. 21]
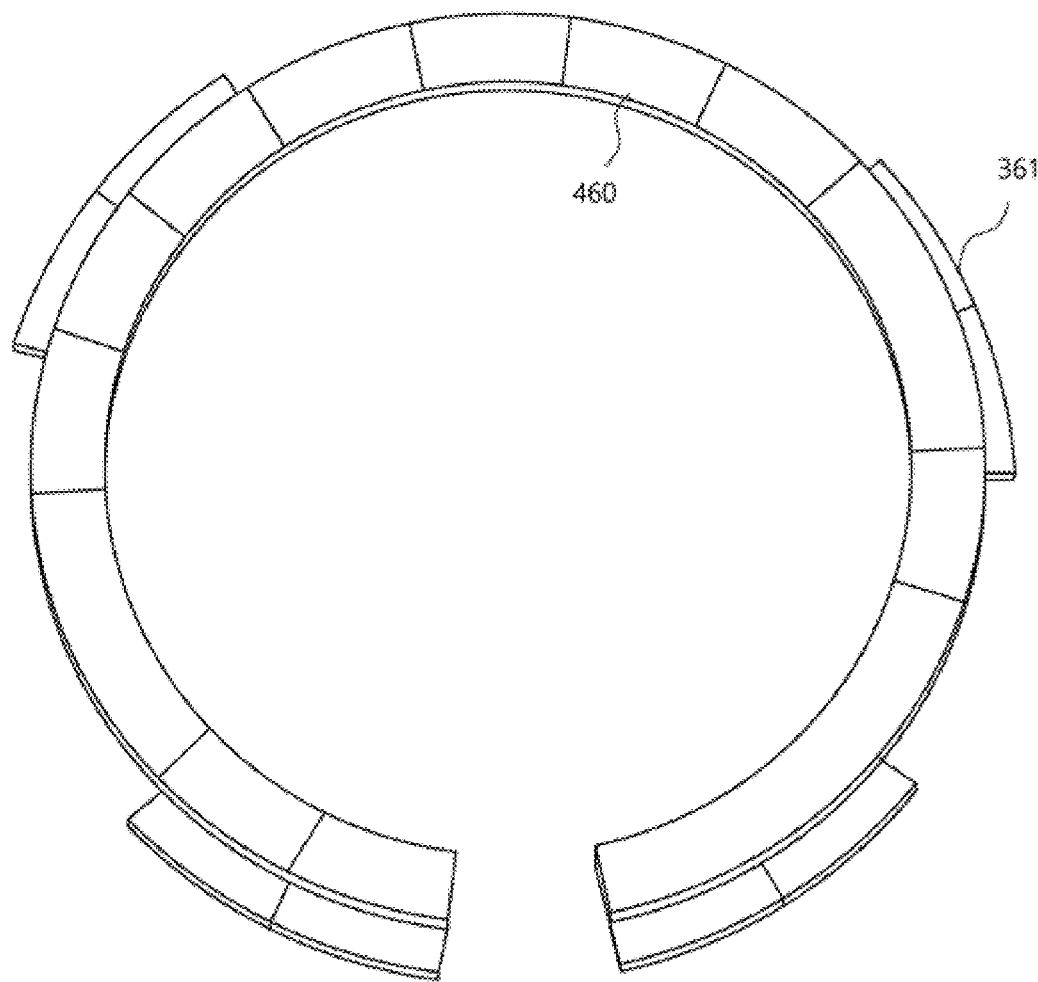

WIRELESS POWER TRANSMITTING APPARATUS FOR WIRELESS CHARGING HAVING COMPATIBILITY

CROSS-REFERENCE TO RELATED APPLICATIONS

This application is a continuation of PCT International Application No. PCT/KR2021/009566 which has an International filing date of Jul. 23, 2021, and which claims priority to Korean patent application numbers 10-2021-0081712 filed Jun. 23, 2021, and 10-2021-0041473 filed Mar. 30, 2021 the entire contents of each of which are incorporated herein by reference.

TECHNICAL FIELD

The disclosure relates to a wireless power transmitting apparatus inside a wireless charger.

BACKGROUND ART

Breaking away from an existing wired charging scheme, a wireless charging technology has recently been applied to a mobile terminal such as a mobile phone. For the wireless charging technology, various technologies such as magnetic induction, magnetic resonance, and the like are being discussed. Currently, a wireless charging technology of charging by transferring electric energy to a magnetic field generated between two coils is mainstream.

In particular, a wireless magnetic attachment-type connector charging scheme has a magnet disposed at an edge of a coil, so that a charger may be attached. However, the wireless magnetic attachment-type connector charging scheme has a concern that charging may not be performed or foreign object detection (FOD) may occur when performing the charging with a general charger.

Accordingly, there was a need for a wireless charger capable of charging both a terminal having the wireless magnetic attachment-type connector charging scheme and a terminal having a general charging scheme, and minimizing the foreign object detection (FOD).

DETAILED DESCRIPTION OF THE INVENTION

Technical Problem

The disclosure aims to provide a structure of a wireless power transmitting apparatus compatible with both a terminal with a general charging function and a terminal with a wireless magnetic attachment-type connector charging function.

Technical Solution

The disclosure provides a wireless power transmitting apparatus including a power transmitting coil for generating an induced electromotive force on a power receiving coil of a terminal, a magnet casing composed of a first space in a shape of a cylinder where the power transmitting coil is inserted, and a second space sharing a central axis of the cylinder with the first space, wherein the second space is a space between the first space and a cylinder having a diameter greater than a diameter of the cylinder of the first space, a ring magnet disposed in the second space of the magnet casing in a shape of a ring, wherein the ring magnet has a height smaller than a height of the magnet casing, wherein the ring magnet is movable in a vertical direction of the magnet casing by external magnetism, and a cover constructed in a direction perpendicular to an axis of the power transmitting coil.

According to an embodiment of the disclosure, the wireless power transmitting apparatus may further include a bottom magnet for alignment on one surface of the wireless power transmitting apparatus.

According to an embodiment of the disclosure, the wireless power transmitting apparatus may further include a side magnet for alignment on one surface of the wireless power transmitting apparatus.

According to an embodiment of the disclosure, the wireless power transmitting apparatus may further include an elastic body for connecting one surface of the magnet casing and the magnet to each other.

According to an embodiment of the disclosure, the wireless power transmitting apparatus may further include a shock absorbing member disposed on at least one of a top surface and a bottom surface of the magnet casing.

According to an embodiment of the disclosure, fluid may be filled in the magnet casing.

According to an embodiment of the disclosure, the ring magnet may have a magnet hole defined in a direction parallel to the central axis of the cylinder.

According to an embodiment of the disclosure, the wireless power transmitting apparatus may further include a coil-internal-magnetic body in an inner space of the power transmitting coil inserted in the first space.

The disclosure provides a wireless power transmitting apparatus including a power transmitting coil for generating an induced electromotive force on a power receiving coil of a terminal, a magnet casing composed of a first space in a shape of a cylinder where the power transmitting coil is inserted, and a second space sharing a central axis of the cylinder with the first space, wherein the second space is a space between the first space and a cylinder having a diameter greater than a diameter of the cylinder of the first space, a magnet for each point disposed in the second space of the magnet casing, wherein the magnet for each point has a height smaller than a height of the magnet casing, wherein the magnet for each point is movable in a vertical direction of the magnet casing by external magnetism, and a cover constructed in a direction perpendicular to an axis of the power transmitting coil.

According to an embodiment of the disclosure, the magnet for each point may move inside the magnet casing by the external magnetism.

The disclosure provides a wireless power transmitting apparatus including a power transmitting coil for generating an induced electromotive force on a power receiving coil of a terminal, a magnet casing having a first space in a shape of an angular pillar where the power transmitting coil is inserted, and a second space sharing a central axis of the angular pillar with the first space, wherein the second space is a space between the first space and an angular pillar having a bottom surface with the same shape as and with a greater area than a bottom surface of the angular pillar of the first space, a polygonal ring magnet disposed in the second space of the magnet casing in a shape of a ring, wherein the polygonal ring magnet has a height smaller than a height of the magnet casing, wherein the polygonal ring magnet is movable in a vertical direction of the magnet casing by external magnetism, and a polygonal cover constructed in a direction perpendicular to an axis of the power transmitting coil.

According to an embodiment of the disclosure, the wireless power transmitting apparatus may further include a bottom magnet for alignment on one surface of the wireless power transmitting apparatus.

According to an embodiment of the disclosure, the wireless power transmitting apparatus may further include a side magnet for alignment on one surface of the wireless power transmitting apparatus.

According to an embodiment of the disclosure, the wireless power transmitting apparatus may further include a shock absorbing member disposed on at least one of a top surface and a bottom surface of the magnet casing.

Advantageous Effects of the Invention

According to one embodiment of the disclosure, it is possible to minimize foreign object detection (FOD) and manufacture a wireless charger with excellent compatibility by varying a position of a magnet based on a charging scheme of a terminal.

In particular, because a coil in a wireless power transmitting apparatus uses a WPC standard and is able to vary a position of a magnet, FOD may be minimized by allowing the magnet and the coil to be spaced apart from each other when performing wireless charging on a terminal that does not include a magnet and uses a WPC standard coil, and the FOD may be minimized by minimizing an overlapping portion of the magnets while having an effect of alignment through a magnetic force when performing the wireless charging on a terminal that includes the magnet and does not use the WPC standard coil.

DESCRIPTION OF THE DRAWINGS

FIG. 1 shows a schematic diagram of a wireless power transmitting apparatus inside a wireless charger according to an embodiment of the disclosure.

FIG. 2 shows alignment of a magnet in a wireless power transmitting apparatus when a wireless charger according to an embodiment of the disclosure is adjacent to a terminal.

FIG. 3 is an exploded perspective view of a wireless power transmitting apparatus according to an embodiment of the disclosure.

FIG. 4 is a perspective view of a wireless power transmitting apparatus when the wireless power transmitting apparatus according to an embodiment of the disclosure and a terminal are spaced apart from each other.

FIG. 5 is a perspective view of a wireless power transmitting apparatus when a terminal is disposed adjacent to a wireless power transmitting apparatus according to an embodiment of the disclosure.

FIG. 6 is a view showing a wireless power transmitting apparatus further including a bottom magnet for alignment on one surface of the wireless power transmitting apparatus according to an embodiment of the disclosure.

FIG. 7 is a view showing a wireless power transmitting apparatus further including a side magnet for alignment on one side surface of the wireless power transmitting apparatus according to an embodiment of the disclosure.

FIG. 8 is a view showing that an elastic body is connected to a ring magnet of a wireless power transmitting apparatus according to an embodiment of the disclosure.

FIG. 9 is a view showing that a shock absorbing member is disposed at each of an upper portion and a lower portion of a magnet casing of a wireless power transmitting apparatus according to an embodiment of the disclosure.

FIG. 10 is a view showing that a magnet hole is defined in a ring magnet of a wireless power transmitting apparatus according to an embodiment of the disclosure.

FIG. 11 is a view showing that a sawtooth-shaped magnet hole is defined in an outer surface of a ring magnet included in a wireless power transmitting apparatus according to an embodiment of the disclosure.

FIG. 12 is a view showing that a sawtooth-shaped magnet hole is defined in each of an inner surface and an outer surface of a ring magnet included in a wireless power transmitting apparatus according to an embodiment of the disclosure.

FIG. 13 is a view illustrating an embodiment of a ring magnet disposed in a wireless power transmitting apparatus according to an embodiment of the disclosure.

FIG. 14 is a view showing that a magnet in a wireless power transmitting apparatus according to an embodiment of the disclosure is composed of a plurality of magnets for each point.

FIG. 15 is a view showing that a coil-internal-magnetic body is disposed inside a power transmitting coil disposed in a first space of a wireless power transmitting apparatus according to an embodiment of the disclosure.

FIG. 16 is a view showing that a solenoid-internal-magnetic body is disposed inside a power transmitting coil without a magnet outside the power transmitting coil corresponding to a ring magnet in a wireless power transmitting apparatus according to an embodiment of the disclosure.

FIG. 17 shows a wireless power transmitting apparatus in a form of a rectangular pillar according to an embodiment of the disclosure.

FIGS. 18 and 19 are views showing arrangement of a wireless power transmitting apparatus and a terminal according to an embodiment of the disclosure.

FIG. 20 is a view showing arrangement of a ring magnet and a terminal-internal-magnet having different sizes during wireless charging.

FIG. 21 shows arrangement of a terminal-internal-magnet and a magnet for each point when using the magnet for each point in a wireless power transmitting apparatus according to an embodiment of the disclosure.

BEST MODE

The disclosure may make various changes and may have several embodiments. Thus, specific embodiments will be illustrated in the drawings and will be described in detail in the text. However, this is not intended to limit the disclosure to specific embodiments, and should be understood to include all changes, equivalents, or substitutes included in the spirit and scope of the disclosure. In describing the disclosure, when it is determined that a detailed description of a related known technology may obscure the gist of the disclosure, a detailed description thereof will be omitted.

Hereinafter, embodiments disclosed in the present specification will be described in detail with reference to the drawings. The exemplary embodiments set forth in the detailed description, drawings and claims are not intended to be limiting, and embodiments other than the described embodiments are able to be used. Other modifications are possible without departing from the spirit or scope of the technology disclosed herein.

Because the description of the disclosed technology is only an embodiment for structural or functional description, the scope of the disclosed technology should not be construed as being limited by the embodiment described in the text. That is, because the embodiment may makes various changes and may have various forms, it should be understood that the scope of the disclosed technology includes equivalents that may realize the technical idea.

Unless otherwise defined, all terms used herein have the same meaning as commonly understood by one of ordinary skill in the art to which the disclosed technology pertains. Terms defined in the dictionary generally used should be interpreted as being consistent with the meaning of the context of the related art, and should not be construed as having an ideal or overly formal meaning unless explicitly defined in this application.

The disclosure relates to a structure of a wireless power transmitting apparatus inside a wireless charger 10 that is compatible with both a terminal having a general charging function and a terminal having a wireless magnetic attachment-type connector charging function.

According to one embodiment of the disclosure, it is possible to minimize foreign object detection (FOD) and manufacture the wireless charger 10 with excellent compatibility by varying a position of a magnet based on a charging scheme of the terminal.

FIG. 1 shows a schematic diagram of a wireless power transmitting apparatus inside the wireless charger 10 according to an embodiment of the disclosure.

Referring to FIG. 1, a wireless power transmitting apparatus 100 according to an embodiment of the disclosure may be disposed inside the wireless charger 10. As a terminal 1 and the wireless charger 10 overlap each other, the wireless power transmitting apparatus 100 may be aligned by being adjacent to a power receiving coil and a magnet in the terminal 1 through a magnetic force. As the wireless power transmitting apparatus 100 is aligned adjacent to the power receiving coil and the magnet in the terminal 1, wireless charging may be performed. Although the wireless charger shown in FIG. 1 is disclosed in a shape of a rectangular parallelepiped, the shape of the wireless charger may not be limited to the rectangular parallelepiped. The wireless charger may have a shape of a cylinder and a polygonal pillar, and may have a shape other than those, and may also have a different size within a range that may achieve a purpose of the wireless charging.

FIG. 2 shows alignment of a magnet in the wireless power transmitting apparatus 100 when the wireless charger according to an embodiment of the disclosure is adjacent to the terminal 1.

When the terminal 1 and the wireless charger are adjacent to each other, the wireless power transmitting apparatus 100 inside the wireless charger may be attached by moving to the magnet inside the terminal by magnetism.

FIG. 3 is an exploded perspective view of a wireless power transmitting apparatus according to an embodiment of the disclosure.

FIG. 4 is a perspective view of a wireless power transmitting apparatus when the wireless power transmitting apparatus according to an embodiment of the disclosure and a terminal are spaced apart from each other.

Referring to FIGS. 3 and 4, the wireless power transmitting apparatus 100 may include a cover 120 in a shape of a lid that covers components in the wireless power transmitting apparatus 100, a power transmitting coil 140 formed in a shape of a solenoid, a ring magnet 160 that has magnetism, and a magnet casing 180 in which the ring magnet 160 may be disposed.

Referring to FIG. 4, the ring magnet 160 in the wireless power transmitting apparatus 100 is disposed at a lower portion of the magnet casing 180. Such arrangement of the ring magnet 160 as described above is resulted from a fact that, because a terminal that does not include the magnet is disposed on top of the wireless charger 10, the ring magnet 160 in the wireless power transmitting apparatus 100 is not affected by a magnetic force from the terminal. In addition, when no external magnetic force influence exists, because no force other than gravity acts on the ring magnet, the ring magnet 160 may be disposed at the lower portion of the magnet casing 180 by the gravity. The terminal that may only be charged using a general wireless charging scheme because of not including the magnet is just not aligned through the magnet, and is able to be charged wirelessly when the coil may be aligned even when not being aligned through the magnet.

In one embodiment of the disclosure, the ring magnet 160 may vary in size in a range in which the power transmitting coil 140 is not magnetized. When placing the terminal without the magnet (a terminal with the general charging function, not the wireless magnetic attachment-type connector charging scheme) on the wireless charger 10 according to an embodiment of the disclosure, the ring magnet in the wireless power transmitting apparatus 100 may be moved to the lower portion of the magnet casing 180 as shown in FIG. 4 to minimize foreign object detection (FOD) between the power receiving coil in the terminal and the power transmitting coil 140 in the wireless power transmitting apparatus 100. The power transmitting coil 140 may have the same size as that in a WPC standard. Because the power transmitting coil 140 meets the WPC standard, the power transmitting coil 140 may have excellent compatibility with terminals using a coil of the WPC standard.

FIG. 5 is a perspective view of a wireless power transmitting apparatus when a terminal is disposed adjacent to a wireless power transmitting apparatus according to an embodiment of the disclosure.

Referring to FIG. 5, the power transmitting coil 140 of the wireless power transmitting apparatus 100 according to an embodiment of the disclosure may generate an induced electromotive force. When the wireless charger 10 equipped with the wireless power transmitting apparatus 100 overlaps the terminal capable of the wireless charging and having the power receiving coil, because the wireless power transmitting apparatus 100 and the power receiving coil are adjacent to each other, the induced electromotive force generated from the power transmitting coil 140 may be transmitted to the power receiving coil of the terminal, so that the wireless charging may be performed. The power transmitting coil 140 may be formed in a cylindrical solenoid shape.

In one embodiment of the disclosure, in the wireless power transmitting apparatus 100, a first space A1 having a cylindrical shape into which the power transmitting coil 140 may be inserted may be defined. The first space A1 may have a diameter larger than that of the power transmitting coil 140 such that the power transmitting coil 140 may be inserted thereinto.

The wireless power transmitting apparatus 100 may include therein a cylinder that shares a central axis of the cylinder with the first space A1 and has a diameter larger than the diameter of the first space A1. The wireless power transmitting apparatus 100 may include the magnet casing 180 having a second space A2 defined therein, which is a space between the cylinder constituting the first space A1 and the cylinder having the diameter larger than the diameter of the first space A1.

The ring magnet 160 is formed in a ring shape in the second space A2 in the magnet casing 180. The ring magnet 160 may be disposed to be lower than the highest portion of the magnet casing 180, and may move in a vertical direction within the magnet casing 180.

The ring magnet 160 in FIG. 5 is disposed adjacent to the cover 120 at the top of the wireless power transmitting apparatus 100. Such placement of the ring magnet 160 as described above is made because, as the terminal including the magnet (e.g., the terminal having the wireless magnetic attachment-type connector charging function) is disposed on top of the wireless charger 10, the ring magnet 160 in the wireless power transmitting apparatus 100 and the magnet in the terminal are attracted to each other. Accordingly, a state in which the ring magnet 160 existing inside the magnet casing 180 has moved in a direction of the magnet in the terminal by the magnetic force is shown. More specifically, before adjoining the terminal including the magnet to the wireless power transmitting apparatus 100, the ring magnet 160 may be located at a place (a lower end) inside the magnet casing 180 the farthest from the cover 120. However, when adjoining the terminal including the magnet to the wireless power transmitting apparatus 100, through the magnetic force between the magnet in the terminal and the ring magnet 160, the ring magnet 160 may move to a place (an upper end) inside the magnet casing 180 the closest to the cover 120. The ring magnet 160 may not be able to move upwardly of the cover 120 because of the cover 120. In one embodiment of the disclosure, the cover 120 may be made of glass, polymer, or the like.

When placing the terminal with the wireless magnetic attachment-type connector charging function on the wireless charger 10 according to an embodiment of the disclosure, the ring magnet in the wireless power transmitting apparatus 100 may be moved to an upper portion of the magnet casing 180 as shown in FIG. 5 to align the power receiving coil in the terminal and the power transmitting coil 140 in the wireless power transmitting apparatus 100.

FIG. 6 is a view showing the wireless power transmitting apparatus 100 further including a bottom magnet 185 for alignment on one surface of the wireless power transmitting apparatus 100 according to an embodiment of the disclosure.

Referring to FIG. 6, according to an embodiment of the disclosure, the wireless power transmitting apparatus 100 may further include the bottom magnet 185 for the alignment on said one surface thereof. The bottom magnet 185 for the alignment has a weaker magnetism than the magnet in the terminal, so that the ring magnet 160 in the wireless power transmitting apparatus 100 may be aligned adjacent to the magnet in the terminal having a magnetic force greater than that of the bottom magnet 185 for the alignment when the terminal with the magnet (e.g., the terminal with the wireless magnetic attachment-type connector charging function) is adjacent to the wireless power transmitting apparatus 100. On the other hand, when the terminal that does not include the magnet is adjacent to the wireless power transmitting apparatus 100 or when no external force is applied to the wireless power transmitting apparatus 100, the ring magnet 160 in the wireless power transmitting apparatus 100 may be fixed to said one side surface of the wireless power transmitting apparatus 100 to which the bottom magnet 185 for the alignment is attached because of a magnetic force with the bottom magnet 185 for the alignment.

In another embodiment of the disclosure, the bottom magnet 185 for the alignment may be attached to the top of the cover 120, or may be attached to a top surface or a bottom surface of the magnet casing. Instead of the bottom magnet 185 for the alignment, an iron-type metal, magnetic material, or the like to which the magnet may be attached may be included. As described above, by including the bottom magnet 185 for the alignment in the wireless power transmitting apparatus 100, when the terminal including the magnet (e.g., the terminal with the wireless magnetic attachment-type connector charging function) is not mounted on the top of the wireless power transmitting apparatus 100, the ring magnet 160 may be fixed inside the wireless power transmitting apparatus 100. Accordingly, when there is an external shock or when carrying or moving the wireless charger 10 including the wireless power transmitting apparatus 100, a movement of the ring magnet 160 inside the magnet casing 180 may be minimized. Therefore, friction between the magnet casing 180 and the ring magnet 160 may be reduced, so that durability may be improved.

FIG. 7 is a view showing the wireless power transmitting apparatus 100 further including a side magnet 186 for alignment on one side surface of the wireless power transmitting apparatus 100 according to an embodiment of the disclosure.

Referring to FIG. 7, the wireless power transmitting apparatus 100 according to an embodiment of the disclosure may further include the side magnet 186 for the alignment on said one surface thereof. The side magnet 186 for the alignment has a weaker magnetism than the magnet in the terminal, so that the ring magnet 160 in the wireless power transmitting apparatus 100 may be aligned adjacent to the magnet in the terminal having the magnetic force greater than that of the side magnet 186 when the terminal with the magnet (e.g., the terminal with the wireless magnetic attachment-type connector charging function) is adjacent to the wireless power transmitting apparatus 100. On the other hand, when the terminal that does not include the magnet is adjacent to the wireless power transmitting apparatus 100 or when no external force is applied to the wireless power transmitting apparatus 100, the ring magnet 160 in the wireless power transmitting apparatus 100 may be fixed at a position to which the side magnet 186 for the alignment is attached due to a magnetic force with the side magnet 186 for the alignment.

In another embodiment of the disclosure, instead of the side magnet 186 for the alignment, the iron-type metal, magnetic material, or the like to which the magnet may be attached may be included. As described above, by including the side magnet 186 for the alignment in the wireless power transmitting apparatus 100, when the terminal including the magnet (e.g., the terminal with the wireless magnetic attachment-type connector charging function) is not mounted on the top of the wireless power transmitting apparatus 100, the ring magnet 160 may be fixed inside the wireless power transmitting apparatus 100. Accordingly, when there is the external shock or when carrying or moving the wireless charger 10 including the wireless power transmitting apparatus 100, the movement of the ring magnet 160 inside the magnet casing 180 may be minimized. Therefore, the friction between the magnet casing 180 and the ring magnet 160 may be reduced, so that the durability may be improved.

FIG. 8 is a view showing that an elastic body 195 is connected to the ring magnet 160 of the wireless power transmitting apparatus 100 according to an embodiment of the disclosure.

Referring to FIG. 8, the wireless power transmitting apparatus 100 according to an embodiment of the disclosure may further include the elastic body 195 connected to the ring magnet 160 on one surface of the magnet casing 180. The elastic body 195 may be formed in a shape of a rubber band or a spring. When the terminal with the magnet (e.g., the terminal with the wireless magnetic attachment-type connector charging function) is adjacent to the wireless power transmitting apparatus 100 including the elastic body 195 as described above, the ring magnet 160 in the wireless power transmitting apparatus 100 may be aligned adjacent to the magnet in the terminal. On the other hand, when the terminal that does not include the magnet is adjacent to the wireless power transmitting apparatus 100 or when no external force is applied to the wireless power transmitting apparatus 100, the ring magnet 160 in the wireless power transmitting apparatus 100 may be disposed at a position spaced apart from the cover 120 of the wireless power transmitting apparatus 100 by the elastic body 195.

As described above, by including the elastic body 195 on said one surface of the wireless power transmitting apparatus 100, when the terminal including the magnet is not mounted on the top of the wireless power transmitting apparatus 100, the ring magnet 160 may be fixed inside the wireless power transmitting apparatus 100. Accordingly, when there is the external shock or when carrying or moving the wireless charger 10 including the wireless power transmitting apparatus 100, the movement of the ring magnet 160 inside the magnet casing 180 may be minimized. Therefore, the friction between the magnet casing 180 and the ring magnet 160 may be reduced, so that the durability may be improved.

FIG. 9 is a view showing that a shock absorbing member 190 is disposed at each of the upper portion and the lower portion of the magnet casing 180 of the wireless power transmitting apparatus 100 according to an embodiment of the disclosure.

Referring to FIG. 9, the shock absorbing member 190 may be further included at zat least one of the upper portion and the lower portion of the magnet casing 180, according to an embodiment of the disclosure. When the shock absorbing member 190 is included at at least one of the upper portion and the lower portion of the magnet casing 180 as described above, because it is possible to reduce noise generated as the ring magnet 160 moves inside the magnet casing 180 and reduce friction generated as the ring magnet 160 moves inside the magnet casing 180, the durability may be improved.

The shock absorbing member 190 is for alleviating the noise and the shock caused by the movement of the ring magnet 160 inside the magnet casing 180. When the above purpose may be achieved, various shapes or types of shock absorbing members may be used. The shock absorbing member 190 according to the disclosure may contain, for example, at least one of a sponge, rubber, a synthetic polymer, and a mat.

In one embodiment of the disclosure, an inner space of the magnet casing 180 may be filled with a fluid. As the inner space of the magnet casing 180 is filled with the fluid, because the noise generated as the ring magnet 160 moves inside the magnet casing 180 may be reduced, and the friction generated as the ring magnet 160 moves inside the magnet casing 180 may be reduced, the durability may be improved. The fluid according to the disclosure may be mineral oil with excellent spoilage and corrosion resistance at a high temperature, animal oil with excellent viscosity and fluidity, grease, which is a semi-solid lubricant, extreme pressure lubricating oil added with extreme pressure agents such as phosphorus, sulfur, chlorine, and the like, non-freezing machine oil with a low freezing point, silicone oil with excellent cold resistance and heat resistance, and the like. However, the present disclosure may not be limited thereto, and other fluids may be used when a purpose of not corroding the interior of the magnet casing 180 and smoothly moving the ring magnet 160 may be achieved.

FIG. 10 is a view showing that a magnet hole 165 is defined in the ring magnet 160 of the wireless power transmitting apparatus 100 according to an embodiment of the disclosure.

Referring to FIG. 10, the ring magnet 160 according to one embodiment of the disclosure may include the magnet hole 165 penetrating the ring magnet 160. The plurality of magnet holes 165 may be defined. When the ring magnet 160 moves in the vertical direction inside the magnet casing 180, the fluid may flow through the magnet hole 165. Accordingly, the ring magnet 160 may move more smoothly inside the magnet casing 180.

The magnet hole 165 may be defined in a direction parallel to the direction in which the ring magnet 160 moves inside the magnet casing 180. As the magnet hole 165 is defined in the direction parallel to the direction in which the ring magnet 160 moves, the ring magnet 160 may move more smoothly inside the magnet casing 180. However, the present disclosure may not be limited thereto, and the magnet hole may be defined at another portion of the ring magnet 160.

FIG. 11 is a view showing that the sawtooth-shaped magnet hole 165 is defined in an outer surface of the ring magnet 160 included in the wireless power transmitting apparatus 100 according to an embodiment of the disclosure.

FIG. 12 is a view showing that the sawtooth-shaped magnet hole 165 is defined in each of an inner surface and the outer surface of the ring magnet 160 included in the wireless power transmitting apparatus 100 according to an embodiment of the disclosure.

Referring to FIGS. 11 and 12, the magnet hole 165 penetrating the ring magnet 160 according to an embodiment of the disclosure may be defined in at least one of the inner surface and the outer surface of the ring magnet 160 in the sawtooth shape. The plurality of magnet holes 165 may be defined. When the ring magnet 160 moves in the vertical direction inside the magnet casing 180, the fluid may flow through the magnet hole 165. Accordingly, the ring magnet 160 may move more smoothly inside the magnet casing 180.

FIG. 13 is a view illustrating an embodiment of the ring magnet 160 disposed in the wireless power transmitting apparatus 100 according to an embodiment of the disclosure.

The ring magnet 160 may be formed in a shape with an open side surface when viewed in a plan view. For example, it is sufficient as long as the ring magnet 160 has a shape in which one side surface is open, such as a C shape, a ⊏ shape, a U shape, a V shape, or the like, and the shape is not limited thereto. In this case, components in the wireless power transmitting apparatus 100 may be disposed in the open space.

FIG. 14 is a view showing that the magnet in the wireless power transmitting apparatus 100 according to an embodiment of the disclosure is composed of a plurality of magnets 161 for each point.

Referring to FIG. 14, the magnet inside the wireless power transmitting apparatus 100 according to an embodiment of the disclosure may be divided into a plurality of points like the magnets 161 for each point, and disposed at specific portions. The magnet inside the wireless power transmitting apparatus 100 may be minimized by disposing the magnets 161 for each point only at the specific portions as described above. The magnet 161 for each point may be constructed to be able to move freely inside the magnet casing 180, or the magnet 161 for each point may be constructed to move only in the vertical direction inside the magnet casing 180. When using a small amount of magnets like the magnets 161 for each point, as magnetic interference is minimized (the FOD is minimized), the wireless charging may be made smoother.

In one embodiment of the disclosure, the ring magnet may be formed in a standing shape. Because the ring magnet exists in the standing shape, the noise generated as the ring magnet moves in the magnet casing may be alleviated, and the friction generated as the ring magnet moves in the magnet casing may be reduced, so that the durability may be improved. FIG. 15 is a view showing that a coil-internal-magnetic body 170 is disposed inside the power transmitting coil 140 disposed in the first space A1 of the wireless power transmitting apparatus 100 according to an embodiment of the disclosure.

Referring to FIG. 15, the ring magnet 160 may be disposed in the magnet casing 180 of the wireless power transmitting apparatus 100, the power transmitting coil 140 having the solenoid shape may be disposed in the first space A1, and the coil-internal-magnetic body 170 may be disposed inside the power transmitting coil 140. The coil-internal-magnetic body 170 may be constructed to have a height smaller than a height of the first space A1 to move in the vertical direction in the first space A1. The ring magnet 160 and the coil-internal-magnetic body 170 may have the same height. As the wireless power transmitting apparatus 100 includes both the ring magnet 160 and the coil-internal-magnetic body 170, the wireless power transmitting apparatus 100 may more smoothly align with the magnet inside the terminal.

In one embodiment of the disclosure, the coil-internal-magnetic body 170 may have a different size in a range in which the power transmitting coil 140 is not magnetized.

In one embodiment of the disclosure, in addition to the elastic body, which is connected to the ring magnet on said one surface of the magnet casing, being further included, an elastic body connected to the coil-internal-magnetic body on one surface of the first space A1 may be further included. The elastic body may be formed in the shape of the rubber band or the spring. When the terminal having the magnet is adjacent to the wireless power transmitting apparatus having the elastic body as described above, the ring magnet in the wireless power transmitting apparatus may be aligned adjacent to the magnet in the terminal.

In one embodiment of the disclosure, in addition to the shock absorbing member being disposed at at least one of the upper portion and the lower portion of the magnet casing, a shock absorbing member may be further included at at least one of an upper portion and a lower portion of the first space A1. As the shock absorbing member is included as above, the noise generated as the ring magnet moves inside the magnet casing may be alleviated, and the friction generated as the ring magnet moves inside the magnet casing may be reduced, so that the durability may be improved.

In one embodiment of the disclosure, in addition to the inner space of the magnet casing 180 being filled with the fluid, the first space A1 may be filled with a fluid. As the fluid is filled as described above, noise generated as at least one of the ring magnet and the coil-internal-magnetic body moves may be alleviated, and friction thereof may be reduced, so that the durability may be improved.

In one embodiment of the disclosure, at least one of the ring magnet 160 and the coil-internal-magnetic body 170 may include the magnet hole 165 passing therethrough. The plurality of magnet holes 165 may be defined. When at least one of the ring magnet 160 and the coil-internal-magnetic body 170 moves in the vertical direction, the fluid may flow through the magnet hole 165.

FIG. 16 is a view showing that a solenoid-internal-magnetic body 171 is disposed inside the power transmitting coil 140 without a magnet outside the power transmitting coil 140 corresponding to the ring magnet in the wireless power transmitting apparatus 100 according to an embodiment of the disclosure.

Referring to FIG. 16, the power transmitting coil 140 having the solenoid structure may be disposed inside the wireless power transmitting apparatus 100, and the solenoid-internal-magnetic body 171 may be disposed in an inner space of the power transmitting coil 140. The solenoid-internal-magnetic body 171 may have a height smaller than that of the first space A1, so that the solenoid-internal-magnetic body 171 may move in the vertical direction inside the first space A1.

FIG. 17 shows a wireless power transmitting apparatus in a form of a rectangular pillar according to an embodiment of the disclosure.

Referring to FIG. 17, a wireless power transmitting apparatus 200 according to an embodiment of the disclosure may include a cover 220 in a form of a rectangular lid that covers components in the wireless power transmitting apparatus 200, a power transmitting coil 240 formed in a shape of a solenoid in a form of the rectangular pillar, a magnet 260 in a form of the square pillar having a magnetism, and a magnet casing 280 in a form of the rectangular pillar in which the magnet 260 in the form of the rectangular pillar may be disposed.

In one embodiment of the disclosure, the rectangular pillar may be an angular pillar including a triangular pillar, a pentagonal pillar, and the like, and the rectangle may be a polygon including a triangle, a pentagon, and the like.

In one embodiment of the disclosure, in the wireless power transmitting apparatus, a first space in a form of the angular pillar into which the power transmitting coil may be inserted may be defined. The first space may have a bottom surface that is larger than a bottom surface of the power transmitting coil such that the power transmitting coil may be inserted thereinto, and may have a height equal to or greater than that of the power transmitting coil.

In the wireless power transmitting apparatus, a second angular pillar having a bottom surface with the same shape as that of a first angular pillar constituting the first space, and with a size greater than that of the first angular pillar may be further included. The first angular pillar and the second angular pillar share an axis of the angular pillar. The wireless power transmitting apparatus may include the magnet casing having a second space defined therein that is a space between the first angular pillar and the second angular pillar.

In the wireless power transmitting apparatus, a polygonal ring magnet that is disposed in the second space of the magnet casing in a form of a polygonal ring, has a height smaller than that of the magnet casing, and is movable in the vertical direction within the magnet casing may be included.

In one embodiment of the disclosure, the wireless power transmitting apparatus having the angular pillar structure may further include a bottom magnet for alignment on one surface thereof. The bottom magnet for the alignment has a weaker magnetism than the magnet in the terminal, so that the ring magnet in the wireless power transmitting apparatus may be aligned adjacent to the magnet in the terminal having a magnetic force greater than that of the bottom magnet for the alignment when the terminal having the magnet is adjacent to the wireless power transmitting apparatus.

In one embodiment of the disclosure, an elastic body connected to the polygonal ring magnet may be further included on one surface of the magnet casing. The elastic body may be formed in the shape of the rubber band or the spring. When the terminal having the magnet is adjacent to the wireless power transmitting apparatus having the elastic body as described above, the polygonal ring magnet in the wireless power transmitting apparatus may be aligned adjacent to the magnet in the terminal.

In one embodiment of the disclosure, in addition to the shock absorbing member being disposed at at least one of the upper portion and the lower portion of the magnet casing, a shock absorbing member may be further included at at least one of an upper portion and a lower portion of the first space. As the shock absorbing member is included as above, noise generated as the polygonal ring magnet moves inside the magnet casing may be alleviated, and friction generated as the ring magnet moves inside the magnet casing may be reduced, so that the durability may be improved.

In one embodiment of the disclosure, an inner space of the magnet casing may be filled with a fluid. As the fluid is filled as described above, the noise generated as the polygonal ring magnet moves may be alleviated, and the friction generated as the ring magnet moves may be reduced, so that the durability may be improved.

In one embodiment of the disclosure, the polygonal ring magnet may include a magnet hole passing therethrough. A plurality of magnet holes may be defined. When the polygonal ring magnet moves in the vertical direction inside the magnet casing, the fluid may flow through the magnet hole.

FIGS. 18 and 19 are views showing arrangement of a wireless power transmitting apparatus 300 and a terminal 400 according to an embodiment of the disclosure.

Referring to FIGS. 18 and 19, the terminal 400 and the wireless power transmitting apparatus 300 may be aligned by a magnet, and may transmit and receive wireless power through a coil.

The wireless power transmitting apparatus 300 according to an embodiment of the disclosure may include a power transmitting coil 340 formed in the shape of the solenoid, a ring magnet 360 having a magnetism, and a magnet casing 320 in which the ring magnet 360 may be disposed. The terminal 400 may include a coil mounting portion 420 on the terminal on which a coil may be mounted, a power receiving coil 440 formed in the shape of the solenoid, and a terminal-internal-magnet 460 disposed inside the terminal. The power transmitting coil 340 and the power receiving coil 440 may have different heights depending on the number of turns or the like.

The power transmitting coil 340 of the wireless power transmitting apparatus 300 may have the same size as that in the WPC standard. Because the power transmitting coil 340 meets the WPC standard, the power transmitting coil 340 may have excellent compatibility with the terminals using the coil of the WPC standard.

As shown in FIG. 18, the ring magnet 360 of the wireless power transmitting apparatus 300 according to an embodiment of the disclosure may have an N pole at an inner portion thereof and an S pole at an outer portion thereof, or may have a shape in which the S pole is disposed at the inner portion thereof and the N pole is disposed at the outer portion thereof. However, the present disclosure may not be limited thereto. As shown in FIG. 19, the ring magnet 360 of the wireless power transmitting apparatus 300 may have a shape in which the N pole is disposed at an upper portion of the wireless power transmitting apparatus 300 and the S pole is disposed at a lower portion, or a shape in which the S pole is disposed at the upper portion and the N pole is disposed at the lower portion.

FIG. 18 shows the terminal 400 using a coil smaller than the WPC standard coil. The ring magnet 360 according to the disclosure may be partially overlapped with the terminal-internal-magnet 460. When the ring magnet 360 and the terminal-internal-magnet 460 completely overlap each other, because a distance between the power transmitting coil 340 and the ring magnet 360 in the wireless power transmitting apparatus 300 becomes smaller, the power transmitting coil 340 and the power receiving coil 440 may be magnetized, so that the FOD may occur. Accordingly, an outer magnetic pole of the terminal-internal-magnet 460 (an S pole of the terminal-internal-magnet 460 in FIG. 18) and an inner magnetic pole of the ring magnet 360 (the N pole of the ring magnet 360 in FIG. 18) may overlap each other, so that the FOD may be minimized during the wireless charging. However, the present disclosure may not be limited thereto, and positions of the N pole and the S pole may be changed.

Referring to FIG. 19, the N pole and the S pole of the ring magnet 360 according to an embodiment of the disclosure may be disposed at the upper portion and the lower portion of the ring magnet 360, rather than being disposed at the inner portion and the outer portion of the ring magnet 360. Accordingly, the outer magnetic pole of the terminal-internal-magnet 460 (the S pole of the terminal-internal-magnet 460 in FIG. 19) and an upper magnetic pole of the ring magnet 360 (the N pole of the ring magnet 360 in FIG. 19) may overlap each other, so that the FOD may be minimized during the wireless charging. However, the present disclosure may not be limited thereto, and the positions of the N pole and the S pole may be changed.

The ring magnet 360 may be disposed in the magnet casing in the wireless power transmitting apparatus, and may be disposed at the lower portion of the magnet casing by the gravity when the terminal that does not include the magnet is adjacent thereto. The terminal that may only be charged using the general wireless charging scheme because of not including the magnet is just not aligned through the magnet, and is able to be charged wirelessly when the coil may be aligned even when not being aligned through the magnet. As the ring magnet 360 is disposed at the lower portion of the magnet casing as described above, the foreign object detection (FOD) may be minimized.

FIG. 20 is a view showing arrangement of the ring magnet 360 and the terminal-internal-magnet 460 during the wireless charging.

The ring magnet 360 may be disposed in a form of partially overlapping with the internal magnet 460 of a specific terminal by using a WPC standard magnet.

FIG. 21 shows arrangement of the terminal-internal-magnet 460 and a magnet 361 for each point when using the magnet 361 for each point in the wireless power transmitting apparatus according to an embodiment of the disclosure.

Referring to FIG. 21, the magnet inside the wireless power transmitting apparatus according to an embodiment of the disclosure may be divided into a plurality of pieces like the magnets 361 for each point, and the plurality of pieces may be disposed at specific portions. The magnet inside the wireless power transmitting apparatus may be minimized by disposing the magnets 361 for each point only at the specific portions as described above. The magnet 361 for each point may be constructed to be able to move freely inside the magnet casing of the wireless power transmitting apparatus, or the magnet 361 for each point may be constructed to move only in the vertical direction inside the magnet casing. When using a small amount of magnets like the magnets 361 for each point, as magnetic interference between the coil and the magnet is minimized (the FOD is minimized), the wireless charging may be made smoother.

In one embodiment of the disclosure, the disclosure above has been described with a focus on preferred experimental examples. A person of ordinary skill in the technical field to which the disclosure belongs will be able to implement embodiments of other forms than those of the detailed description of the disclosure within the essential technical scope of the disclosure. Herein, the essential technical scope of the disclosure is indicated in the claims, and all differences within the scope equivalent thereto should be construed as included in the disclosure.

The invention claimed is:

1. A wireless power transmitting apparatus for wireless charging having compatibility capable of transmitting power to a terminal regardless of a presence or absence of a magnet inside the terminal comprising:
   a power transmitting coil for generating an induced electromotive force on a power receiving coil of a terminal;
   a magnet casing composed of a first space in a shape of a cylinder where the power transmitting coil is inserted and fixed, and a second space sharing a central axis of the cylinder with the first space, wherein the second space is a space between the first space and a cylinder having a diameter greater than a diameter of the cylinder of the first space;
   a ring magnet disposed in the second space of the magnet casing in a shape of a ring, wherein the ring magnet has a height smaller than a height of the magnet casing, wherein the ring magnet is movable in a vertical direction of the magnet casing by external magnetism; and
   a cover constructed in a direction perpendicular to an axis of the power transmitting coil,
   wherein when transmitting power to the terminal, a position of the ring magnet is changed according to the presence or absence of a magnet in the terminal,
   wherein when the terminal does not include a magnet, the ring magnet is disposed in the lower part of the second space, and
   wherein the terminal includes a magnet, the ring magnet is disposed closest to the terminal in the second space.

2. The wireless power transmitting apparatus of claim 1, further comprising:
   a bottom magnet for alignment on one surface of the wireless power transmitting apparatus.

3. The wireless power transmitting apparatus of claim 1, further comprising:
   a side magnet for alignment on one surface of the wireless power transmitting apparatus.

4. The wireless power transmitting apparatus of claim 1, further comprising:
   an elastic body for connecting one surface of the magnet casing and the ring magnet to each other.

5. The wireless power transmitting apparatus of claim 1, further comprising:
   a shock absorbing member disposed on at least one of a top surface and a bottom surface of the magnet casing.

6. The wireless power transmitting apparatus of claim 1, wherein fluid is filled in the magnet casing.

7. The wireless power transmitting apparatus of claim 6, wherein the ring magnet has a magnet hole defined in a direction parallel to the central axis of the cylinder.

8. The wireless power transmitting apparatus of claim 1, further comprising:
   a coil-internal-magnetic body in an inner space of the power transmitting coil inserted in the first space.

9. A wireless power transmitting apparatus for wireless charging having compatibility of transmitting power to a terminal regardless of a presence or absence of a magnet inside the terminal comprising:
   a power transmitting coil for generating an induced electromotive force on a power receiving coil of a terminal;
   a magnet casing composed of a first space in a shape of a cylinder where the power transmitting coil is inserted and fixed, and a second space sharing a central axis of the cylinder with the first space, wherein the second space is a space between the first space and a cylinder having a diameter greater than a diameter of the cylinder of the first space;
   a magnet for each point disposed in the second space of the magnet casing, wherein the magnet for each point has a height smaller than a height of the magnet casing, wherein the magnet for each point is movable in a vertical direction of the magnet casing by external magnetism; and
   a cover constructed in a direction perpendicular to an axis of the power transmitting coil,
   wherein when transmitting power to the terminal, a position of the magnet for each point is changed according to the presence or absence of a magnet in the terminal,
   wherein when the terminal does not include a magnet, the magnet for each point is disposed in the lower part of the second space, and
   wherein the terminal includes a magnet, the magnet for each point is disposed closest to the terminal in the second space.

10. The wireless power transmitting apparatus of claim 9, wherein the magnet for each point moves inside the magnet casing by the external magnetism.

11. A wireless power transmitting apparatus for wireless charging having compatibility capable of transmitting power to a terminal regardless of a presence or absence of a magnet inside the terminal comprising:
    a power transmitting coil for generating an induced electromotive force on a power receiving coil of the terminal;
    a magnet casing composed of a first space in a shape of an angular pillar where the power transmitting coil is inserted and fixed, and a second space sharing a central axis of the angular pillar with the first space, wherein the second space is a space between the first space and an angular pillar having a bottom surface with the same shape as and with a greater area than a bottom surface of the angular pillar of the first space;
    a polygonal ring magnet disposed in the second space of the magnet casing in a shape of a ring, wherein the polygonal ring magnet has a height smaller than a height of the magnet casing, wherein the polygonal ring magnet is movable in a vertical direction of the magnet casing by external magnetism; and
    a cover constructed in a direction perpendicular to an axis of the power transmitting coil,
    wherein when transmitting power to the terminal, a position of the polygonal ring magnet is changed according to the presence or absence of a magnet, in the terminal,
    wherein when the terminal does not include a magnet, the polygonal ring magnet is disposed in the lower part of the second space, and wherein the terminal includes a magnet, the polygonal ring magnet is disposed closest to the terminal in the second space.

12. The wireless power transmitting apparatus of claim 11, further comprising:
a bottom magnet for alignment on one surface of the wireless power transmitting apparatus.

13. The wireless power transmitting apparatus of claim 11, further comprising:
a side magnet for alignment on one surface of the wireless power transmitting apparatus.

14. The wireless power transmitting apparatus of claim 11, further comprising:
a shock absorbing member disposed on at least one of a top surface and a bottom surface of the magnet casing.

* * * * *